United States Patent [19]

Goebel et al.

[11] Patent Number: 5,027,652
[45] Date of Patent: Jul. 2, 1991

[54] SUPPORT FOR SENSORS, AND SENSOR PROVIDED THEREWITH

[75] Inventors: Ulrich Goebel, Reutlingen; Martin Holland; Richard Muehlheim, both of Tübingen; Botho Ziegenbein, Reutlingen, all of Fed. Rep. of Germany

[73] Assignee: Robert Bosch GmbH, Stuttgart, Fed. Rep. of Germany

[21] Appl. No.: 439,499

[22] Filed: Nov. 20, 1989

[30] Foreign Application Priority Data

Jan. 7, 1989 [DE] Fed. Rep. of Germany ... 8900142[U]

[51] Int. Cl.$^5$ .............................................. G01F 1/68
[52] U.S. Cl. ................................................ 73/204.26
[58] Field of Search ............ 73/118.2, 204.23, 204.25, 73/204.26

[56] References Cited

U.S. PATENT DOCUMENTS

| 4,320,655 | 3/1982 | Kammermaier et al. | ........ 73/204.26 |
| 4,471,647 | 9/1984 | Jerman et al. | ................... 73/23.1 X |
| 4,633,578 | 1/1987 | Aine et al. | ................. 73/204.23 X |
| 4,680,963 | 7/1987 | Tabata et al. | ............... 73/204.23 X |
| 4,783,996 | 11/1988 | Ohta et al. | ................... 73/204.26 X |

Primary Examiner—Herbert Goldstein
Attorney, Agent, or Firm—Michael J. Striker

[57] ABSTRACT

A support for sensor elements, especially temperature, throughflow or chemical sensors, comprises a supporting element composed of a ceramic material and having at least one throughgoing opening, a thin ceramic foil arranged on the supporting element so as to cover the opening to support a sensor element in the region of the opening.

7 Claims, 1 Drawing Sheet

SUPPORT FOR SENSORS, AND SENSOR PROVIDED THEREWITH

BACKGROUND OF THE INVENTION

The present invention relates to a support for sensors, as well as a sensor provided with such a support.

Supports for sensors, especially temperature, throughflow or chemical sensors composed of a ceramic material are known. In the known support, the sensors are arranged on a ceramic plate. The ceramic plate is relatively thick and therefore has a relatively high thermal conductivity. Thereby the sensor can not react sufficiently fast to the temperature or throughflow quantity changes of a medium to be measured.

SUMMARY OF THE INVENTION

Accordingly, it is an object of the present invention to provide a support for sensor, as well as a sensor with such a support, which avoid the disadvantages of the prior art.

More particularly, it is an object of the present invention to provide a support for a sensor and a sensor with a support, with improved reaction to temperature or through-flow quantity changes in a medium to be measured.

In keeping with these objects and with others which will become apparent hereinafter, one feature of the present invention resides, briefly stated, in a support which has a supporting element composed of a ceramic material and having at least one throughgoing opening, and a thin ceramic foil which covers the throughgoing opening and carries a sensor element in the region of the opening.

When the support and a sensor are designed in accordance with these features a high thermal uncoupling between the sensor element and the case is possible.

In accordance with another feature of the present invention the ceramic foil is composed of a glass-rich ceramic. The thermal conductivity of the glass-rich ceramic is very low and it enables a fast measurement of the temperature or the throughflow.

For sensors with a single heater, it is further possible to adjust a constant temperature difference between the hot surface of the glass-rich ceramic and the incoming air quantity or to maintain it constant. This heater, contrary to the support on which the electronic is arranged, is thermally well decoupled.

In accordance with a further feature of the present invention, the evaluating electronic circuit is arranged on the support and used for the sensor element.

Still a further feature of the present invention is that the support can be composed of several, non-sintered or green ceramic foil layers.

Finally, the sensor can be formed as a throughflow sensor, and the ceramic foil can be arranged approximately parallel to a flow of the medium to be measured.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENT

Figure 1:
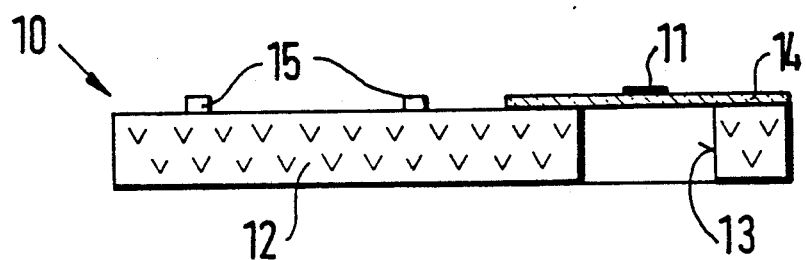
FIG. 1 is a view showing a cross-section of a support for a sensor in accordance with the present invention.
Figure 2:
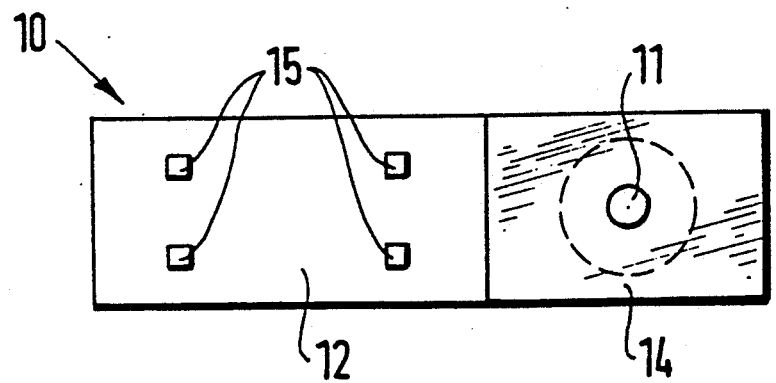
FIG. 2 is a plan view of the support with the sensor element in accordance with the present invention.

In FIG. 1 a support for a sensor element 11 is identified with reference numeral 10. The sensor element is used for determination of a temperature or a throughflow quantity of a flowing medium. The support 10 is formed as a ceramic plate 12 composed of $Al_2O_3$. A hole 13 is punched in the plate 12 in a green condition, or in other words, in condition before sintering of the plate. Also, several openings can be provided in the plate 12. The diameter of the openings can be from 5-10 mm.

A thin ceramic lamella 14 can be provided in the region of the hole 13 on the plate 12. The ceramic lamella is composed of glass-rich ceramic and serves as a diaphragm. The lamella 14 has a thickness of approximately 100 um, while the plate 12 has a thickness of approximately 630 um. The sensor element 11 is arranged substantially centrally in the region of the opening 13.

An evaluating electronic circuit 15 is arranged further on the lamella 12 for evaluating the measurement signals of the sensor element 11. The evaluating electronic circuit 15 is printed on the plate 12 in the region without holes 13 or near the lamella 14 on the plate 12. The thermal conductivity of the glass-rich ceramic amounts to approximately only 10% of the thermal conductivity of $Al_2O_3$ ceramic. Thereby a thermal decoupling between the sensor element 11 and the plate 12 is obtained.

The sensor elements 11 for determination of a temperature or throughflow quantity are applied for example by thick layer technique and often have a heater for enabling a fast and accurate measurement. This heat can however influence the evaluating electronic circuit 15 due to the relatively high thermal conductivity of the plate 12 composed of $Al_2O_2$ and thereby produce false measurement values. Further, it is required that the sensor element 11 be arranged on a diaphragm which is as thin as possible, while to the contrary the evaluating electronic circuit 15 must be applied on such a substrate which is as thick and as hard as possible.

In accordance with an especially advantageous embodiment of the invention, the support 10 is oriented with its longitudinal axis in a flow direction of the predetermined medium. Thereby the wave front of the medium acts not directly on the sensor element 11, but instead acts as a tangent to the sensor element.

It is not necessary that the support be composed of a single, thick plate. It is also possible in accordance with an alternative embodiment of the invention, that the support is composed of several thin ceramic foils which are assembled to form the support.

It will be understood that each of the elements described above, or two or more together, may also find a useful application in other types of constructions differing from the types described above.

While the invention has been illustrated and described as embodied in a support for sensor elements, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

We claim:

1. A sensor for temperature, throughflow and chemical measurements comprising a support including a supporting element composed of $Al_2O_3$ and having at least one throughgoing opening, and a thin ceramic foil arranged on said supporting element so as to cover said opening; and a sensor element supported on said ceramic foil in the region of said opening and applied by thick film technique.

2. A sensor as defined in claim 1, wherein said supporting element has a plurality of such throughgoing openings, said thin ceramic foil being arranged on said supporting element to cover said openings.

3. A sensor as defined in claim 1, wherein said ceramic foil is composed of glass-rich ceramic.

4. A sensor as defined in claim 1; and further comprising an evaluating electronic circuit provided for said sensor element and arranged on said support.

5. A sensor as defined in claim 1, wherein said sensing element is formed for sensing a throughflow of a medium, said ceramic foil being arranged substantially parallel to a flow of a medium to be measured.

6. A support for sensor elements, especially temperature, throughflow or chemical sensors, comprising a supporting element composed of a ceramic material and having at least one throughgoing opening; a thin ceramic foil arranged on said supporting element so as to cover said opening to support a sensor element in the region of said opening, said supporting element being composed of a plurality of unsintered ceramic foil layers.

7. A sensor comprising at least one sensor element; and a support including a supporting element composed of a ceramic material and having at least one throughgoing opening, and a thin ceramic foil arranged on said supporting element so as to cover said opening to support a sensor element in the region of said opening, said supporting element being composed of a plurality of unsintered ceramic foil layers.

* * * * *